United States Patent
Archibald et al.

(10) Patent No.: US 11,522,451 B2
(45) Date of Patent: Dec. 6, 2022

(54) INDUCTOR BINNING ENHANCED CURRENT SENSE

(71) Applicant: Alpha and Omega Semiconductor (Cayman) Ltd., Grand Cayman (KY)

(72) Inventors: Nicholas I. Archibald, San Francisco, CA (US); Rhys S. A. Philbrick, Los Gatos, CA (US); Steven P. Laur, Raleigh, NC (US)

(73) Assignee: ALPHA AND OMEGA SEMICONDUCTOR (CAYMAN) LTD., Grand Cayman (KY)

( * ) Notice: Subject to any disclaimer, the term of this patent is extended or adjusted under 35 U.S.C. 154(b) by 10 days.

(21) Appl. No.: 16/714,493

(22) Filed: Dec. 13, 2019

(65) Prior Publication Data
US 2021/0184572 A1    Jun. 17, 2021

(51) Int. Cl.
H02M 3/158 (2006.01)
H02M 1/08 (2006.01)
H02M 1/00 (2006.01)

(52) U.S. Cl.
CPC ............. *H02M 3/158* (2013.01); *H02M 1/08* (2013.01); *H02M 1/0009* (2021.05)

(58) Field of Classification Search
CPC ............. H02M 3/156–157; H02M 3/335–337
See application file for complete search history.

(56) References Cited

U.S. PATENT DOCUMENTS

| | | | | |
|---|---|---|---|---|
| 5,367,247 A * | 11/1994 | Blocher | ................ | H02M 3/156 323/284 |
| 6,225,791 B1 * | 5/2001 | Fujii | ..................... | H02J 3/1814 323/207 |
| 6,242,895 B1 * | 6/2001 | Fujii | ........................ | G05F 1/70 323/207 |
| 7,656,003 B2 | 2/2010 | Davies | | |
| 7,902,803 B2 * | 3/2011 | Peng | ..................... | H02M 3/157 323/283 |
| 7,919,952 B1 * | 4/2011 | Fahrenbruch | ......... | H02M 3/156 323/284 |
| 8,212,570 B1 * | 7/2012 | Farrow | .................. | G01R 31/50 324/509 |
| 8,299,764 B2 | 10/2012 | Laur et al. | | |

(Continued)

FOREIGN PATENT DOCUMENTS

CN    113809916    *    6/2021
TW    200816451 A        4/2008

(Continued)

OTHER PUBLICATIONS

Mondal, Ashis. "Digital PID Controller Design for DC-DC Buck Converter" Masters Thesis, National Institute of Technology, Rourkela. May 2014.

(Continued)

*Primary Examiner* — Kevin J Comber
*Assistant Examiner* — Nusrat Quddus
(74) *Attorney, Agent, or Firm* — JDI Patent; Joshua Isenberg; Robert Pullman

(57) ABSTRACT

An apparatus, comprising, a MOSFET, a controller coupled to the MOSFET, an inductor conductively coupled to the MOSFET. A reported current output of the controller is adjusted based on a predetermined excursion of an attribute of the inductor from a fixed attribute value.

10 Claims, 6 Drawing Sheets

(56) References Cited

U.S. PATENT DOCUMENTS

| | | | |
|---|---|---|---|
| 8,901,899 B1* | 12/2014 | Kiadeh | H02M 3/1588 323/285 |
| RE45,773 E | 10/2015 | Houston et al. | |
| 9,531,282 B1* | 12/2016 | Nikitin | H02M 7/04 |
| 9,601,997 B2* | 3/2017 | Yan | H02M 3/157 |
| 9,793,800 B1* | 10/2017 | Yan | H02M 3/157 |
| 9,823,328 B2 | 11/2017 | Rahardjo et al. | |
| 10,063,146 B1* | 8/2018 | Lee | G01R 19/16552 |
| 10,461,732 B1* | 10/2019 | Norling | H03K 17/168 |
| 10,468,993 B2* | 11/2019 | Rotzoll | H02M 7/493 |
| 2001/0046145 A1* | 11/2001 | Oknaian | H02M 3/1588 363/98 |
| 2005/0151518 A1* | 7/2005 | Schneiker | H02M 3/156 323/222 |
| 2006/0001408 A1 | 1/2006 | Southwell et al. | |
| 2006/0043954 A1* | 3/2006 | Markowski | H02M 3/157 323/283 |
| 2007/0210777 A1* | 9/2007 | Cervera | H02M 3/157 323/284 |
| 2007/0274015 A1* | 11/2007 | Isham | H02H 7/1227 361/93.1 |
| 2008/0197823 A1* | 8/2008 | Crowther | H02M 3/1584 323/271 |
| 2009/0002056 A1* | 1/2009 | Doyle | G01R 19/0092 327/512 |
| 2009/0146621 A1* | 6/2009 | Tang | H02M 3/1584 323/234 |
| 2009/0146635 A1 | 6/2009 | Qiu et al. | |
| 2009/0146643 A1* | 6/2009 | Ostrom | H02M 3/156 324/123 R |
| 2010/0320974 A1* | 12/2010 | Manlove | H02M 3/157 323/222 |
| 2011/0316508 A1* | 12/2011 | Cheng | H02M 1/14 323/282 |
| 2012/0049826 A1 | 3/2012 | Hsu et al. | |
| 2013/0249518 A1* | 9/2013 | Giannopoulos | H02M 3/156 323/284 |
| 2013/0307511 A1* | 11/2013 | De Vries | G01R 19/0092 323/284 |
| 2014/0015500 A1* | 1/2014 | Babazadeh | H02M 3/1584 323/272 |
| 2014/0028331 A1 | 1/2014 | Bai et al. | |
| 2014/0292300 A1* | 10/2014 | Yan | H02M 3/156 323/288 |
| 2015/0115910 A1* | 4/2015 | Jiang | H02M 3/1584 323/271 |
| 2015/0200593 A1* | 7/2015 | Stoichita | H02M 3/156 323/271 |
| 2015/0288285 A1* | 10/2015 | Paul | H02M 3/158 323/271 |
| 2015/0323570 A1* | 11/2015 | Guthrie | H02M 3/157 324/130 |
| 2015/0349634 A1* | 12/2015 | Tschirhart | H02M 3/156 323/271 |
| 2016/0013719 A1* | 1/2016 | Babazadeh | H02M 3/157 323/271 |
| 2016/0062375 A1* | 3/2016 | Houston | H02M 3/156 323/280 |
| 2016/0065067 A1* | 3/2016 | Isham | G01K 13/00 323/271 |
| 2016/0313380 A1* | 10/2016 | Trichy | G01R 1/203 |
| 2017/0025947 A1* | 1/2017 | Wang | H02M 3/156 |
| 2017/0025961 A1* | 1/2017 | Seeman | H02M 1/08 |
| 2017/0060213 A1* | 3/2017 | Wu | G06F 1/26 |
| 2017/0063215 A1* | 3/2017 | Nikitin | H02M 1/12 |
| 2017/0063239 A1* | 3/2017 | Wu | G06F 1/26 |
| 2018/0048232 A1* | 2/2018 | Adell | H02M 3/157 |
| 2019/0199210 A1* | 6/2019 | Shao | H02M 3/1588 |
| 2019/0288603 A1* | 9/2019 | Babazadeh | H02M 3/1588 |
| 2021/0126540 A1* | 4/2021 | Babazadeh | H02M 3/1588 |
| 2021/0408911 A1* | 12/2021 | Upadhyaya | H02M 1/325 |

FOREIGN PATENT DOCUMENTS

| | | |
|---|---|---|
| TW | 201040686 A | 11/2010 |
| TW | 201217936 A | 5/2012 |
| TW | 201405137 A | 2/2014 |

OTHER PUBLICATIONS

Office Action dated Jul. 5, 2021 in Taiwanese Patent Application No. 109143861;The Foreign Office Action cites references:1:US2009/01466352::TW2014051373:2006/0001408. The Office Action rejected claims 1, 10-11 as anticipated by Ref. 1 Figs. 1-2 para. [0011-0017], Claims 2 and 12 are rejected as obvious in over Ref. 1 in view of Ref. 2 Figs. 1-2, para. [0010-0013]. Claim 9 is rejected as obvious over Ref. 1 in view of Ref. 3 Figs. 6-7 para. [0059-0063]. Claims 3-8 were deemed allowable.

* cited by examiner

INDUCTOR BINNING ENHANCED CURRENT SENSE

FIELD OF THE INVENTION

Aspects of the present disclosure generally relate to power regulators and more particularly to power monitoring and internal control of power regulators.

BACKGROUND OF THE INVENTION

Binning in electronics is the process of separating a production lot of electrical components or devices based on one or more of their characteristics. For example, Multi-core central processing units (CPUs) may be binned based on clock speed capability. Components may also be binned for a single characteristic as a pass or fail indicator for the production lot. For inductors, Direct Current resistance (DCR) may be used to pass or fail devices in a production lot. As an example, inductors two or more standard deviations outside the mean DCR of the production lot may be discarded and recycled as scrap where the Mean DCR meets a production specification, as they fail to the meet a base specification. Additionally, during production of components or devices there may be problems with material quality or manufacturing that result in the characteristic of the mean of components or devices failing to meet a specification. This is called a production shift and results in lower than expected component or device yield.

Generally, specifications for components or devices are chosen to ensure compatibility with other components or devices when working in a system. Placement of specification limits creates a baseline working condition for each device in the system and creates a working window in which proper component or device operation can be reliably attained. Failure of a component or device to reliably operate within specifications is often considered a component failure and other components or devices in the system are not expected to operate reliably due to the out of specification operation. While device specifications ensure compatibility, they also increase the cost of devices or components as stringent specification requirements may need stricter materials and manufacturing controls.

For switch mode regulators a key specification is voltage error where a switch mode regulator is specified to produce a required voltage within certain error constraints. For example, a switch mode power supply may be required to supply 5 volts with +/−0.05 volt error. To attain this voltage error specification the switch mode regulator manufacturer may require each component within the power supply to fall within a certain range of DCR values. Devices that fall outside this range are binned as out of specification and discarded. Discarding out of specification inductors increases the overall price of power regulators.

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Figure 1A:
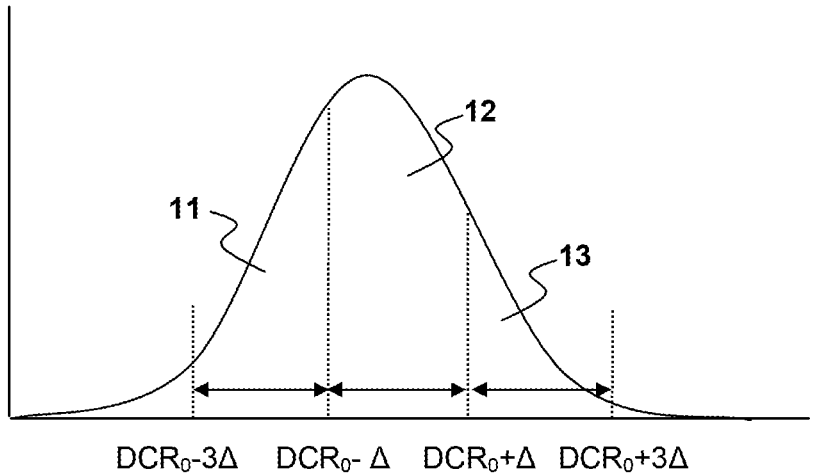
FIG. 1A is a graph depicting an example of a distribution of inductor values according to aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to aspects of the present invention, it would be advantageous to be able to use inductors that are traditionally considered out of specification to create power regulator that operates within overall device specification guidelines. Using traditionally out of specification inductors would reduce the overall price of power regulator devices and allow increased availability of parts when a production shift would make a large portion of a production lot inviable under traditional specification guidelines.

As discussed above during production inductors are often binned using DCR as a defining attribute. An inductor manufacturer may sell and/or label inductors based on a predetermined excursion of the attribute of the inductors from a nominal value. Here the excursion from the nominal DCR value may be measured in units of resistance, e.g., Ohms or milliOhms (mOhm) or may be a relative measure, such as a percentage.

Traditionally an inductor manufacturer may choose to only sell inductors that fall within a certain percentage above or below the nominal DCR value. They may also sell inductors that fall within wider ranges than this, but certain customers, e.g., power regulator manufacturers, are often willing to pay a premium for a tighter distribution. The tighter distribution ensures that power regulator manufacturers are able to use the inductors without having to adjust for the DCR of the inductor during production. Conversely, this also means that inductor manufacturers need to find customers who are prepared to buy inductors having DCR values that fall outside the tighter range. If this is not possible, the inductors often end up as wasted as scrap material, which pushes up the cost of inductors to cover this waste. Inductor manufacturers may label lots of inductors with their range of excursion from the nominal DCR value but this information is not used by power regulator manufactures because current practices ensure that most inductors are fit for their purpose. For example, manufacturers may group inductors having DCR values within ±5% of nominal value in their premium grouping and sell inductors DCR values in wider ranges say ±8% or ±10%) for a lower price. However, even within the ±5% grouping a power regulator manufacturer might not be able to meet the resulting spec.

The DCR of an inductor will lead to an error in the reported current output by a power regulator. This current level may be used to adjust the target output voltage (VOUT_target) of the power regulator relative to nominal value (nominal_VOUT_target) using a specification called voltage droop, which is related to a drop in VOUT_target as the current load Iout increases as in the following equation:

$$VOUT\_target = nominal\_VOUT\_target - Rdroop * Iout$$

In the above equation, Rdroop, sometimes referred to herein as the "droop factor" is a gain of a droop function. As can be seen, the load current Iout sometimes needs to be monitored in order to take voltage droop into account.

Ideally, the gain of the droop term fed into the PID controller for a power regulator would be tuned to the exact DCR of the inductor and other components of the regulator to ensure exact voltage output. It is generally economically infeasible for power regulator manufacturers to test each inductor for DCR, and sometimes architecturally impossible for the end circuit to do so itself, in order to automatically calibrate, and therefore manufactures simply rely on the general pass/fail binning performed by inductor manufacturers.

According to aspects of the present disclosure, the gain of a power controller's droop function and output current reporting may be chosen based on an excursion of an attribute of an inductor from a nominal attribute value to ensure accurate current output and decrease the cost of power regulators. In this way, a power regulator manufacture may take advantage of information already made available by inductor manufacturers and decrease costs by using inductors that would normally be considered less than optimal.

Method

The DCR of an inductor is typically very small but it can have an effect on the accuracy of current regulation. FIG. 1B depicts a method for tuning a power regulator according to aspects of the present disclosure. A power regulator manufacturer receiving a production lot of inductors may perform a statistical analysis on the DCR values of the inductors at 102 lot to determine such values as, without limitation mean DCR, median DCR, DCR Range, DCR Mode, Nominal DCR value etc. Alternatively, the inductor manufacture may perform these statistical analyses and provide them to a power regulator producer. During or after the statistical analysis of the production lot, the excursion from a fixed DCR value may be determined for each inductor, as indicated at 103.

Determination of the DCR may be performed using a test apparatus that runs a known current through the inductor and monitors the drop in voltage to determine the resistance of the inductor according to Ohms law. Each inductor in the production lot may have its DCR determined this way and statistical analysis may then optionally be performed over the entire production lot of inductors.

Traditional binning groups inductors into various distributions of different tightness specs (e.g., ±5%, ±8%), but it doesn't allow the center value of the distribution to shift. Also, using standard deviations as a measure might not be particularly useful. Generally standard deviations are simultaneously applied in both positive and negative directions relative to the mean. Furthermore, manufacturers might not typically divulge information regarding standard deviations of distributions. According to aspects of the present disclosure, it us more useful to describe ranges of values in terms of percentage bands from the inductor mean DCR (i.e., the DCR value the inductor manufacturer determines as the mean of the distribution on their datasheet). In alternative implementations ranges of values may be described in absolute terms in mOhms.

Figure 1B:
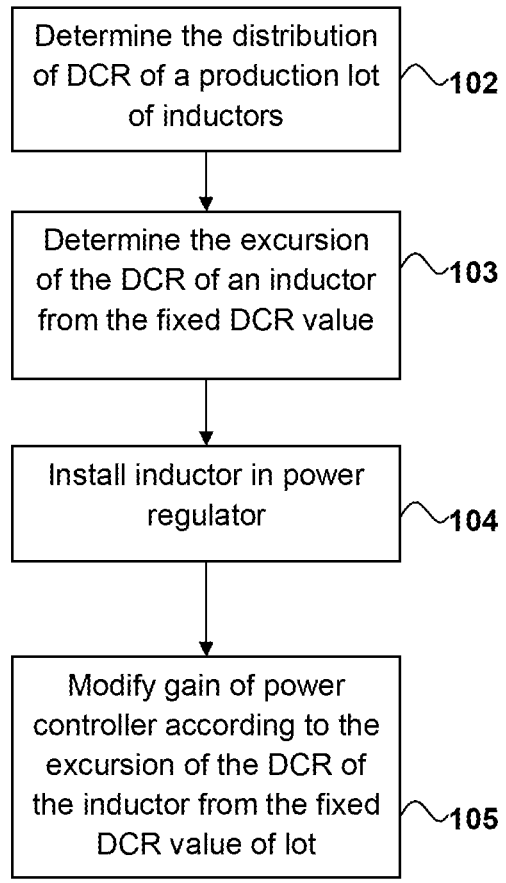
FIG. 1B depicts a block diagram of a method for tuning a power regulator according to aspects of the present disclosure.

FIG. 1A illustrates an example of a distribution divided into three ranges in terms of a fixed value $DCR_0$ and an excursion increment A. In this example, a first range 11 contains values between $DCR_0-3\Delta$ to $DCR_0-A$, a second range 12 contains values between $DCR_0-\Delta$ and $DCR_0+A$, and a third range 13 contains DCR values between $DCR_0+\Delta$ and $DCR_0+3\Delta$. By way of numerical example, the DCR distribution for a production lot of inductors having a fixed value $DCR_0$ of 1.00 mOhm and an excursion increment A of 0.03 mOhm with DCR values in the distribution ranging from 0.91 mOhm to 1.09 mOhm, i.e., excursions ranging from ±0.09 mOhm or ±9%. In this numerical example, the DCR values in the above ranges would be from 0.91 mOhm to 0.97 mOhm for the first group 11, from 0.97 to 1.03 mOhm for the second group 12 and from 1.03 to 1.09 mOhms for the third group 13. This is the same as excursion ranges of −9% to −3%, −3% to +3% and +3% to +9%, and would allow accuracy to ±3% after the gain adjustment in all cases, while using ±9% inductors.

The excursion of the DCR for the inductor from the fixed DCR value may alternatively be defined, by way of example and without limitation, in terms of standard deviations from the nominal DCR, bins from the nominal DCR, percentiles etc. After the excursion of the DCR of the inductor from the fixed DCR value has been determined, the inductor may be installed with other components to create a power regulator, as indicated at 104. Specifically, the inductor may be connected to one or more transistors, a capacitor and a controller that may include a proportional integral and derivative controller (PID), a pulse width modulated signal generator (PWM) and a gate driver housed either individually or together as one or more discrete packages.

Before, after or during installation the controller may be tuned according to the predetermined excursion of the DCR from the fixed DCR value, as indicated at 105. Referring to the above equation, the gain (Rdroop) of measured current Iout can be tuned before being used to either add droop to the nominal target voltage (i.e., drop Vout from the nominal target voltage nominal_VOUT_target in proportion to the load level Iout) or to simply report an accurate current level.

Figure 2:
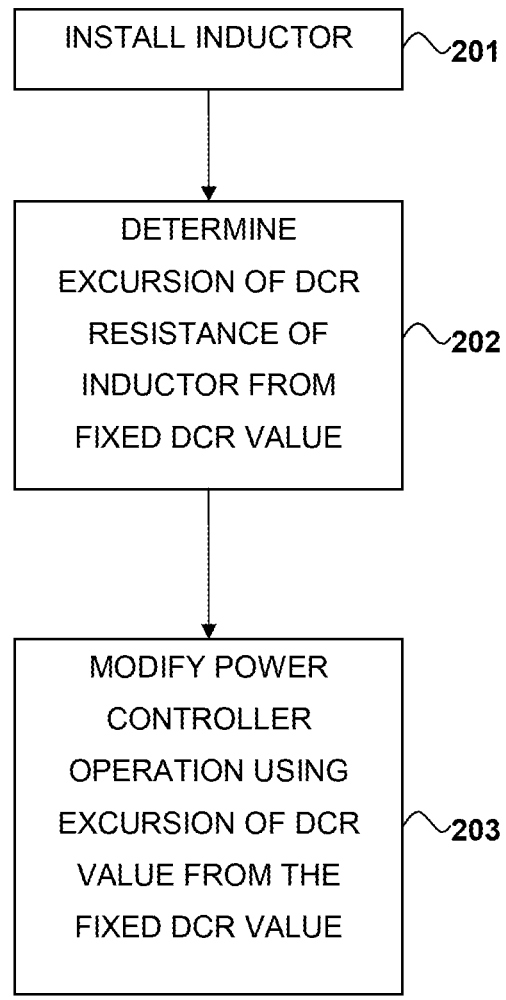
FIG. 2 shows a block diagram of another method for tuning a power regulator according to aspects of the present disclosure.

FIG. 2 shows another method for tuning a power regulator according to aspects of the present disclosure. In this embodiment, a third party has manufactured and tested the inductor. A power regulator manufacturer thus may simply receive the inductor from an inductor producer, as indicated at 201. Prior to shipping inductors to manufacturers, inductor producers test and bin their inductors to ensure the bin has a tight enough distribution to meet the specifications of power regulator manufacturers. A power regulator manufacturer using methods according to aspects of the present disclosure may construct power regulators using inductors that would, under traditional circumstances, have been binned for recycling by the inductor producer. The power regulator manufacture may use these traditionally out of specification parts by utilizing binning data already generated by inductor manufactures to choose a gain for the controller. The inductor manufacturer may provide the excursion of the DCR from the fixed DCR value with inductor. The power regulator manufacturer may use this information to determine the excursion of the DCR value of the inductor from the fixed DCR value, as indicated at 202. The power regulator manufacture may use that information to tune a controller in the power regulator at 203. The controller may be tuned by modifying a gain of the controller.

Additionally, the inductor manufacturer may customize its binning of inductors to match the new requirements of the power regulator manufacturer. The binning system may be changed to allow more precision tuning of the controller. According to aspects of the present disclosure, the width and the center of each bin may be adjusted so that power regulators can use inductors from the entire distribution.

Device

Figure 3:
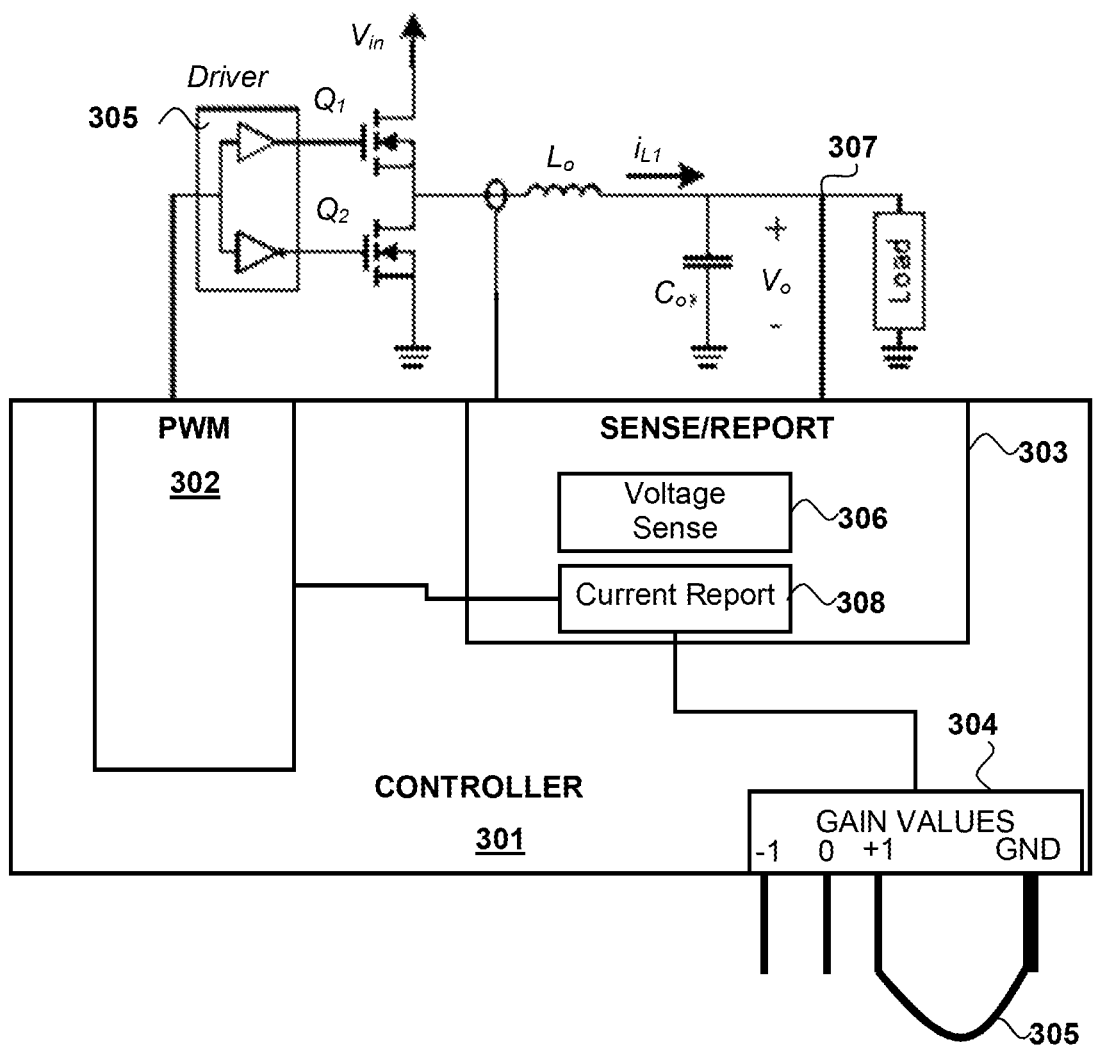
FIG. 3 shows a schematic diagram a power regulator device with a controller having output current reporting tuned with a pin jumper according to aspects of the present disclosure.

FIG. 3 shows a power regulator device with a controller tuned with a pin jumper according to aspects of the present disclosure. A power regulator may comprise one or more electronic switches $Q_1$, $Q_2$, an inductor $L_O$, a capacitor $C_O$ a controller 301 and a transistor driver 306. It should be noted that though the implementation shown in FIG. 3 is arranged with two transistor switches the breadth of this disclosure is not so limited, one transistor may be replaced with a diode and all transistors may be replaced with other electrical switches such as and without limitation a vacuum tube pentode, triode, relay etc. Furthermore, although a single phase regulator is shown in FIG. 3, aspects of the present disclosure also encompasses implementations involving multiple phase regulators.

During operation, the electronic switches, transistors, $Q_1$ and $Q_2$ may be controlled by electrical signals from the Driver 305 received at their gate. The Driver 305 may receive control signals from the controller 301. As shown the controller may comprises a pulse width modulated signal generator 302, a sense and reporting circuit 303 and a gain value determination unit 304. The sense and reporting circuit 303 includes a sense element 306 that senses a voltage across the inductor $L_O$ and a current reporting element 308 that determines a current Iout from the sensed voltage and reports it. The gain value determination unit 304 may be configured to determine a gain Rdroop to be applied on the sensed current Iout, which is used to set the output voltage target according to the droop function described above. In some implementations this may be limited to reporting of the current Iout, and have no impact on VOUT_target. Additionally, the controller may receive feedback 307 after the inductor $L_O$ and the capacitor $C_O$. Aspects of the present disclosure avoid the need to include a separate current sense element before the inductor $L_O$ that delivers a signal proportional to the current flowing into the inductor. Instead, a secondary characteristic of the inductor $L_O$, namely DCR, may be used to measure the current without having to add additional components.

In the depicted embodiment the gain value determination unit 304 is set by the power regulator manufacturer using a pin jumper 305 between pins that are delineated based on the excursions from the fixed DCR value. In the illustrated example the excursions are in arbitrary units and the jumper is shown grounding the pin indicating that the installed inductor is from a bin characterized by a +1 unit excursion from the fixed DCR value of the production lot. To implement this, the gain value determination unit 304 may apply appropriate gain values Rdroop in current reporting circuit observing $L_O$ to an amplifier in the sense/report circuit 303 and subsequently set the gain to the appropriate level for the installed inductor. The signal generated by the sense/report circuit 303 is subsequently sent to the PWM generator 302 where it is converted to a Pulse width modulated signal and delivered to the driver 305.

Though the controller 301 and driver 306 are shown as separate discrete components but in, some embodiments may be implemented as a single package. Additionally, in other implementations, the sense/report circuit 303, PWM 302 and gain value 304 determination components may be separate discrete units or integrated circuitry.

Figure 4:
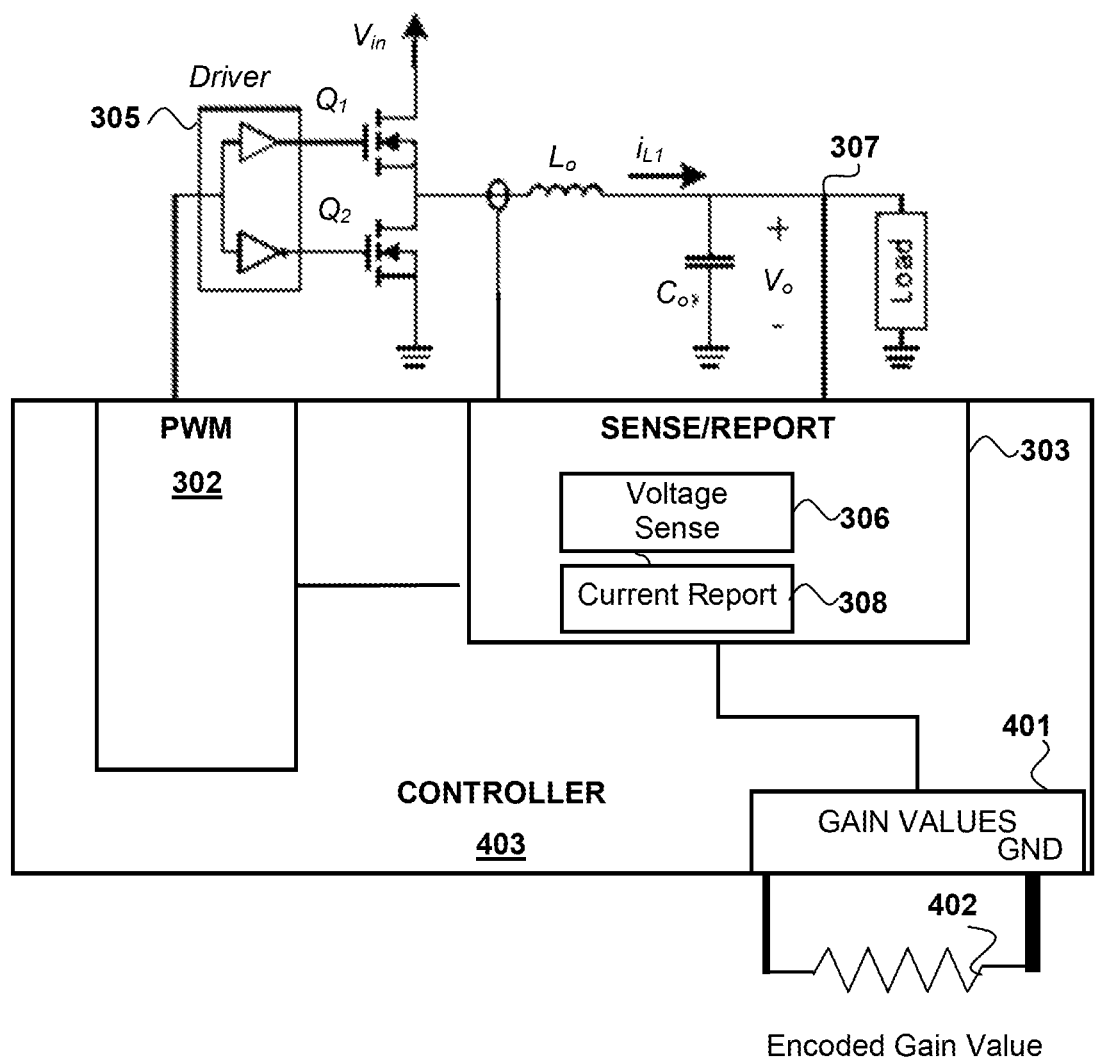
FIG. 4 depicts a schematic diagram of an alternative power regulator device with a controller having output current reporting tuned with a resistor according to aspects of the present disclosure.

FIG. 4 depicts an alternative power regulator device with a controller 403 tuned with a resistor 402 according to aspects of the present disclosure. In the embodiment, depicted embodiment the gain value determination unit may be set using a resistor 402 between an input pin and a ground pin. The resistor may have resistance chosen based on the excursion of the DCR of the inductor from the fixed DCR value. When a fixed current or voltage is applied to it, the resulting voltage drop across/current flow though the resistor 402 may be decoded by the gain value determination unit 401 and used to apply the appropriate gain to the current reporting element 308. Alternatively, the gain value determination unit 401 may include a circuit that uses the resistor in an analog way to define a gain without needing to decode it. The appropriate gain may be applied by providing a current to an amplifier in the gain current reporting element 308. The discrete gain values of the gain value determination unit 401 may be chosen to match the different bins of the excursions from the fixed DCR values. For example, the discrete values may represent the gain values compensating for −2, −1, 0, 1 and +1 units of excursion from the fixed DCR value.

Figure 5:
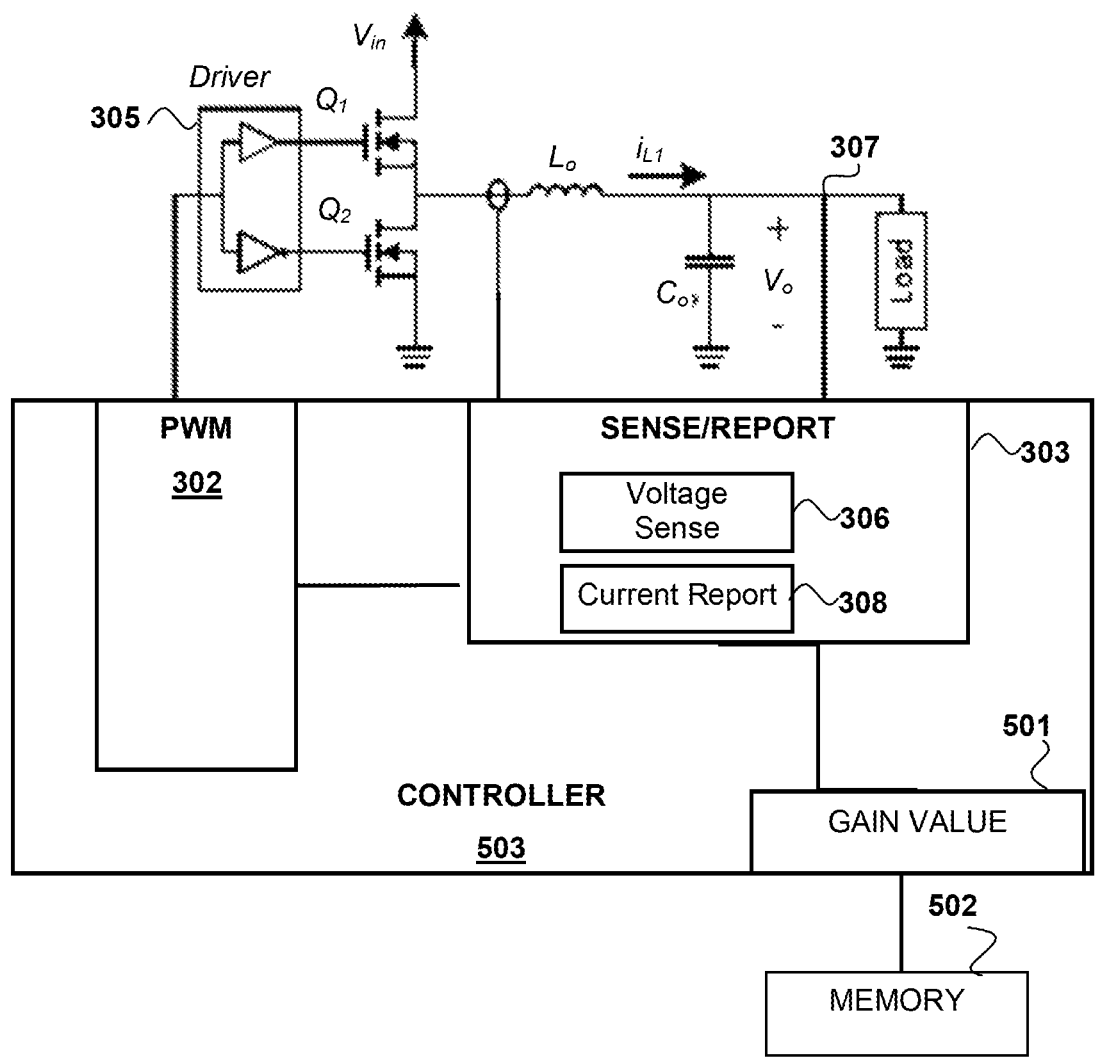
FIG. 5 shows a schematic diagram of another embodiment of a power regulator with a controller having output current reporting tuned from a memory according to aspects of the present disclosure.

FIG. 5 shows another implementation of a power regulator with a controller 503 tuned from memory. As shown the gain value determination unit 501 is set using a memory 502. The memory may hold information representing the excursion of the DCR of the installed inductor $L_O$ from the fixed DCR value. The gain value determination unit 501 may be configured to read this information from the memory and convert the value to the appropriate corresponding gain and apply that gain to the current reporting element 308. The appropriate gain may be applied by providing a current to an amplifier in the current reporting element The circuitry of the gain value determination unit 501 may be configured to apply discrete gain values to the current reporting element 308 based on information stored in the memory.

The gain value determination unit may for example and without limitation comprise a memory unit having a non-transitory table containing gain values that correspond excursions of the DCR of an inductor from a fixed DCR value. The table may optionally contain additional information, for example and without limitation, different gain values depending on variables such as part serial number, production lot number, inductor manufacturer, inductor production date etc. Correspondingly, the memory 502 may optionally contain additional information about the installed inductor such as, and without limitation, part serial number, production lot number, inductor manufacturer, inductor production date etc. The memory itself may be any such device configured to retain information in an encoded form such as and without limitation a magnetic charge state, a transistor state, diode configuration, an optical interference pattern, etc. Some examples of memory are without limitation, EEPROMs, EPROMs, PROM, or NVRAM. The inductor manufacturer with information about the inductor may program the memory 502; alternatively, the power regulator producer using information provided by the inductor manufacturer may program the memory.

Figure 6:
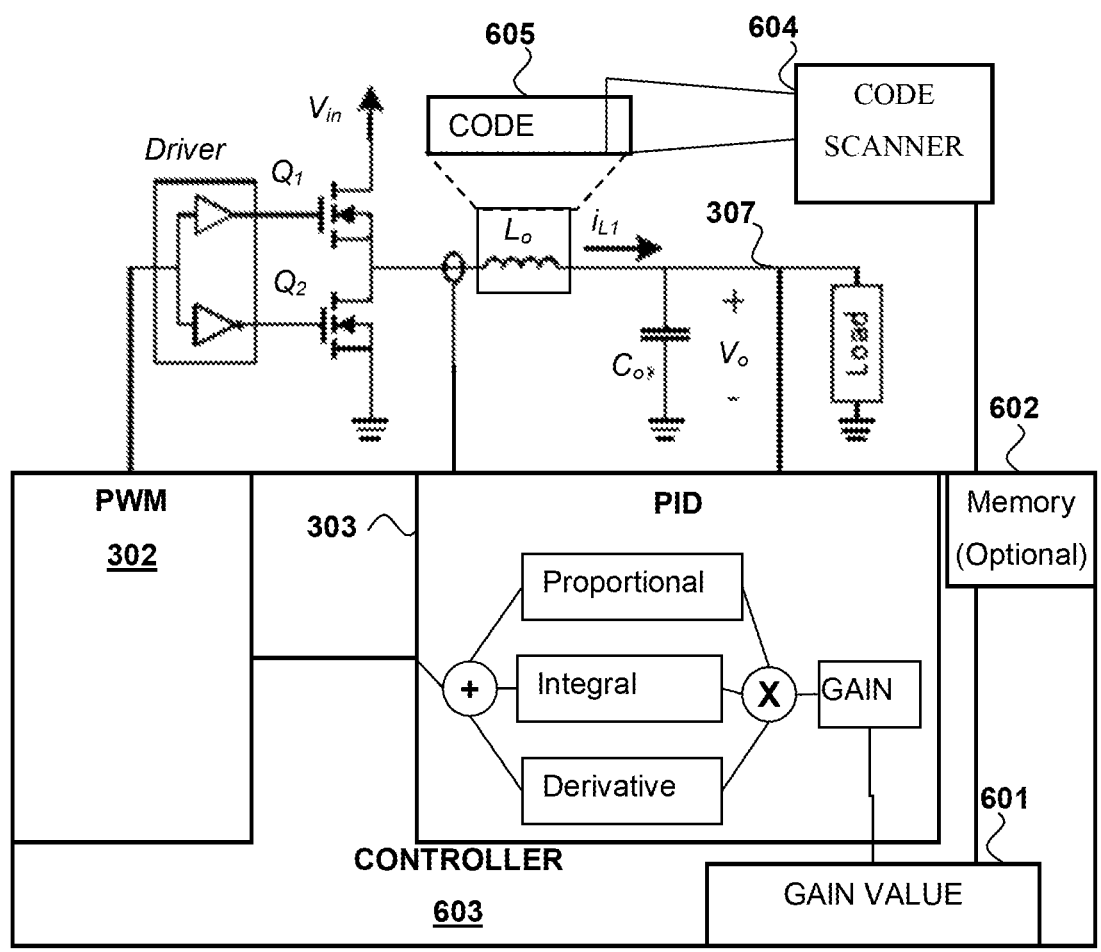
FIG. 6 depicts a schematic diagram of yet another example of a power regulator with a controller having output current reporting tuned from coded information.

FIG. 6 depicts yet another example of a power regulator with a controller 603 tuned from a code 605, which has encoded in it information representing the excursion of the DCR of the inductor from the fixed DCR value. As shown, the controller may be selectively coupled to a code scanner 604. Such an implementation is useful in situations where there is a barcode or other indicia on the inductor that can be read and then stored in memory. The code scanner 604 may be configured to optically detect information encoded as alternating dark and light colored areas on the surface of a material. The code 605 may be located anywhere in the vicinity of the inductor $L_0$ for example and without limitation the code 605 may be printed on the inductor $L_0$ itself, on a sticker near the inductor or otherwise included with the inductor. By way of example, and not by way of limitation, the code scanner 604 may be a barcode scanner or other optical code scanner, e.g., a QR code scanner and the code 605 may be a corresponding code, e.g., barcode or QR code.

During tuning, the controller 603 may be coupled to the code scanner 604 may read the code 605. The code scanner may communicate this information to the controller 603 where the gain value determination unit 601 may be configured to receive this information from the barcode scanner and convert the information to the appropriate corresponding gain. The gain value determination unit may apply the appropriate gain level based on the information to the current reporting element 308. The circuitry of the gain value determination unit 601 may be configured to apply discrete gain values based on information received from the barcode scanner 604. Additionally, the controller 603 may (optionally) be configured to include a memory 602. The memory 602 may be configured to store information from the barcode 605 read by the barcode scanner 604. The addition of the memory allows the controller to retain the information even when the barcode 605 and/or barcode scanner 604 is no longer present.

Aspects of the present disclosure allow inductors that are traditionally considered out of specification to be used in power regulators that operate within overall device specification guidelines. Using such out of specification inductors would reduce the overall price of power regulator devices and allow increased availability of parts that would otherwise be possible. Alternatively, this can be used to allow the device specification to be tightened to levels that would normally be economically unfeasible.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An apparatus, comprising:
a MOSFET;
a controller coupled to the MOSFET;
an inductor conductively coupled to the MOSFET, wherein a gain of a current reported by the controller is adjusted based on an excursion, of an attribute of the inductor from a fixed attribute value, wherein the excursion of the attribute of the inductor from the fixed attribute value is an excursion of a DC Resistance (DCR) value of the inductor from a fixed DCR value, wherein the excursion of the attribute of the DCR value of the inductor from the fixed DCR value is determined before the inductor is installed in the apparatus, wherein information is encoded on the inductor representing the excursion of the DCR value of the inductor from the fixed value; and
a gain value determination unit coupled to the controller, wherein the gain value determination unit is configured to receive the information encoded on the inductor from a code scanner configured to identify the information and configured to apply the adjusted gain to the reported current.

2. A method for tuning a power controller, comprising:
determining an excursion of a DC resistance (DCR) of an inductor in the power controller from a fixed DCR value from information encoded on the inductor with a code scanner configured to identify the information encoded on the inductor corresponding to the excursion of the DCR of the inductor in the power controller from the fixed DCR value; and
modifying operation of the power controller using the excursion of the DCR from the fixed DCR value wherein a gain of a current reported by the controller is not adjusted by a current sense element coupled to the MOSFET before the inductor that generates a signal proportional to a current flowing into the inductor.

3. The method of claim 2, wherein modifying the power controller operation includes adjusting a current reported by the power controller.

4. The method of claim 2 wherein the excursion of the DCR value of the inductor is measured in mOhm.

5. The method of claim 2 wherein the excursion of the DCR value of the inductor is measured in percent.

6. The apparatus of claim 1 wherein the excursion of an attribute of the inductor from a fixed attribute value is determined from at least a manufacturing lot of the inductor.

7. The apparatus of claim 1 wherein the excursion of an attribute of the inductor from a fixed attribute value is determined from at least statistical analysis performed on a production lot of the inductor.

8. The apparatus of claim 7 wherein the excursion of an attribute of the inductor from a fixed attribute value is measured with the inductor before the inductor is installed in the apparatus.

9. The apparatus of claim 1 wherein the excursion of the DCR value of the inductor is measured in mOhm.

10. The apparatus of claim 1 wherein the excursion of the DCR value of the inductor is measured in percent.

* * * * *